(12) United States Patent
Roberts et al.

(10) Patent No.: US 11,489,158 B2
(45) Date of Patent: Nov. 1, 2022

(54) USE OF ALUMINUM IN A LITHIUM RICH CATHODE MATERIAL FOR SUPPRESSING GAS EVOLUTION FROM THE CATHODE MATERIAL DURING A CHARGE CYCLE AND FOR INCREASING THE CHARGE CAPACITY OF THE CATHODE MATERIAL

(71) Applicant: Dyson Technology Limited, Wiltshire (GB)

(72) Inventors: Matthew Robert Roberts, Oxford (GB); Peter George Bruce, Oxford (GB); Francis Gachau Kinyanjui, Nairobi (KE)

(73) Assignee: Dyson Technology Limited, Malmesbury (GB)

( * ) Notice: Subject to any disclaimer, the term of this patent is extended or adjusted under 35 U.S.C. 154(b) by 0 days.

(21) Appl. No.: 16/955,029

(22) PCT Filed: Dec. 18, 2018

(86) PCT No.: PCT/GB2018/053663
§ 371 (c)(1),
(2) Date: Jun. 17, 2020

(87) PCT Pub. No.: WO2019/122851
PCT Pub. Date: Jun. 27, 2019

(65) Prior Publication Data
US 2020/0381726 A1     Dec. 3, 2020

(30) Foreign Application Priority Data
Dec. 18, 2017 (GB) .................................. 1721180

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ...................................................... H01M 4/505
See application file for complete search history.

(56) References Cited

U.S. PATENT DOCUMENTS 3,761,500 A    9/1973 Thomas
3,993,508 A    11/1976 Erlichman
(Continued)

FOREIGN PATENT DOCUMENTS

CA    2527207 A1    12/2004
CN    101128941 A   2/2008
(Continued)

OTHER PUBLICATIONS

Birrozzi et al. (2016). "Beneficial effect of propane sultone and tris(trimethylsilyl) borate as electrolyte additives on the cycling stability of the lithium rich nickel manganese cobalt (NMC) oxide," Journal of Power Sources 325:525-533.
(Continued)

*Primary Examiner* — Peter F Godenschwager
(74) *Attorney, Agent, or Firm* — Faegre Drinker Biddle & Reath LLP

(57) ABSTRACT

Use of aluminum in a lithium rich cathode material of the general formula (I) for suppressing gas evolution from the cathode material during a charge cycle and for increasing the charge capacity of the cathode material.

20 Claims, 6 Drawing Sheets

(51) Int. Cl.
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2002/20* (2013.01); *C01P 2002/52* (2013.01); *C01P 2002/72* (2013.01); *C01P 2006/40* (2013.01); *H01M 2004/028* (2013.01)

(56) References Cited

U.S. PATENT DOCUMENTS

| | | |
|---|---|---|
| 4,047,289 A | 9/1977 | Wolff |
| 4,288,381 A | 9/1981 | Dozzi et al. |
| 5,136,046 A | 8/1992 | Park et al. |
| 5,250,784 A | 10/1993 | Muller et al. |
| 5,411,592 A | 5/1995 | Ovshinsky et al. |
| 5,718,989 A | 2/1998 | Aoki et al. |
| 6,616,714 B1 | 9/2003 | Gauthier et al. |
| 7,754,384 B2 | 7/2010 | Patoux et al. |
| 8,122,250 B2 | 2/2012 | Haverinen |
| 8,153,301 B2 | 4/2012 | Jiang |
| 8,546,018 B2 | 10/2013 | Kajiyama |
| 8,722,250 B2 | 5/2014 | Park |
| 9,293,766 B2 | 3/2016 | Liu et al. |
| 9,325,030 B2 | 4/2016 | Zidan |
| 9,525,173 B2 | 12/2016 | Kagei et al. |
| 9,575,025 B2 | 2/2017 | Nakayama et al. |
| 9,593,024 B2 | 3/2017 | Thackeray et al. |
| 9,692,084 B2 | 6/2017 | Yang et al. |
| 9,755,272 B2 | 9/2017 | Gaben |
| 9,768,450 B2 | 9/2017 | Song et al. |
| 9,843,041 B2 | 12/2017 | Lopez |
| 9,893,376 B2 | 2/2018 | Yang et al. |
| 9,947,916 B2 | 4/2018 | Oda |
| 9,960,458 B2 | 5/2018 | Weicker et al. |
| 9,997,774 B2 | 6/2018 | Hiratsuka |
| 10,199,649 B2 | 2/2019 | Beck et al. |
| 10,290,869 B2 | 5/2019 | Axelbaum |
| 10,629,902 B2 | 4/2020 | Yu |
| 2002/0110733 A1 | 8/2002 | Johnson |
| 2003/0162086 A1 | 8/2003 | Longhi, Jr. et al. |
| 2004/0091779 A1 | 5/2004 | Kang et al. |
| 2005/0014065 A1 | 1/2005 | Jung et al. |
| 2005/0112466 A1 | 5/2005 | Jordy et al. |
| 2006/0160261 A1 | 7/2006 | Sheats |
| 2007/0238019 A1 | 10/2007 | Laurent et al. |
| 2008/0263855 A1 | 10/2008 | Li et al. |
| 2008/0264478 A1 | 10/2008 | Ahn et al. |
| 2009/0148764 A1 | 6/2009 | Kwak et al. |
| 2010/0108939 A1 | 5/2010 | Breger et al. |
| 2010/0233542 A1 | 9/2010 | Endo et al. |
| 2011/0126402 A1 | 6/2011 | Kwak et al. |
| 2011/0129594 A1 | 6/2011 | Kwak et al. |
| 2011/0168944 A1 | 7/2011 | Chang et al. |
| 2011/0291043 A1* | 12/2011 | Wilcox ................ H01M 4/525 252/182.1 |
| 2011/0294015 A1 | 12/2011 | Pirk et al. |
| 2011/0311883 A1 | 12/2011 | Oukassi et al. |
| 2012/0183855 A1 | 7/2012 | Wohlfahrt-Mehrens et al. |
| 2012/0225199 A1 | 9/2012 | Muthu et al. |
| 2012/0270114 A1 | 10/2012 | Reynolds et al. |
| 2012/0312474 A1 | 12/2012 | Kwak et al. |
| 2012/0321815 A1 | 12/2012 | Song et al. |
| 2013/0040201 A1 | 2/2013 | Manthiram |
| 2013/0160283 A1 | 6/2013 | Wu |
| 2013/0260248 A1* | 10/2013 | Seki .................. H01M 4/505 429/221 |
| 2013/0298387 A1 | 11/2013 | Kobier et al. |
| 2014/0007418 A1 | 1/2014 | Song et al. |
| 2014/0120397 A1 | 5/2014 | Kim et al. |
| 2014/0154581 A1 | 6/2014 | Kawasato et al. |
| 2014/0227609 A1 | 8/2014 | Frey et al. |
| 2014/0242463 A1 | 8/2014 | Song |
| 2014/0255603 A1 | 9/2014 | Xiao et al. |
| 2015/0010822 A1 | 1/2015 | Nakahara et al. |
| 2015/0010872 A1 | 1/2015 | Schindler et al. |
| 2015/0050522 A1 | 2/2015 | Manthiram et al. |
| 2015/0064558 A1 | 3/2015 | Seki et al. |
| 2015/0102530 A1 | 4/2015 | Wallace et al. |
| 2015/0180031 A1 | 6/2015 | Thackeray et al. |
| 2015/0188186 A1 | 7/2015 | Bedjaoui et al. |
| 2015/0280201 A1 | 10/2015 | Bhardwaj |
| 2016/0164088 A1 | 6/2016 | Peralta et al. |
| 2016/0164092 A1 | 6/2016 | Stottlemyer |
| 2016/0218362 A1 | 7/2016 | Kagei et al. |
| 2016/0218364 A1 | 7/2016 | Sakai et al. |
| 2016/0254539 A1 | 9/2016 | Kagei et al. |
| 2016/0294010 A1 | 10/2016 | Herb et al. |
| 2016/0372783 A1 | 12/2016 | Min et al. |
| 2017/0133678 A1 | 5/2017 | Ozoemena et al. |
| 2019/0044182 A1 | 2/2019 | Maeda et al. |
| 2019/0115627 A1 | 4/2019 | Rendall |
| 2019/0334171 A1 | 10/2019 | Ozoemena |
| 2020/0220221 A1 | 7/2020 | Keyzer et al. |
| 2020/0280099 A1 | 9/2020 | Keyzer et al. |
| 2020/0335786 A1 | 10/2020 | Roberts et al. |
| 2020/0377376 A1 | 12/2020 | Roberts et al. |
| 2020/0381718 A1 | 12/2020 | Roberts et al. |
| 2020/0381724 A1 | 12/2020 | Roberts et al. |
| 2020/0381725 A1 | 12/2020 | Roberts et al. |

FOREIGN PATENT DOCUMENTS

| | | |
|---|---|---|
| CN | 101562245 A | 10/2009 |
| CN | 101694876 A | 4/2010 |
| CN | 101855770 A | 10/2010 |
| CN | 102054986 A | 5/2011 |
| CN | 102881873 A | 1/2013 |
| CN | 103035900 A | 4/2013 |
| CN | 103311513 A | 9/2013 |
| CN | 103545519 A | 1/2014 |
| CN | 105742607 A | 7/2016 |
| CN | 105810934 A | 7/2016 |
| CN | 103943844 B | 8/2016 |
| CN | 106410186 A | 2/2017 |
| CN | 104241633 B | 9/2017 |
| DE | 4227720 A1 | 4/1993 |
| EP | 1189296 A2 | 3/2002 |
| EP | 2746288 A1 | 6/2014 |
| EP | 2763219 A2 | 8/2014 |
| EP | 2827430 A1 | 1/2015 |
| EP | 3093272 A1 | 11/2016 |
| GB | 1402544 A | 8/1975 |
| GB | 2128604 A | 5/1984 |
| JP | 45-035555 | 11/1970 |
| JP | 57-96472 | 6/1982 |
| JP | S64-21870 A | 1/1989 |
| JP | H4-269721 A | 9/1992 |
| JP | 09-237631 A | 9/1997 |
| JP | 2000-149911 A | 5/2000 |
| JP | 2002-343342 A | 11/2002 |
| JP | 2003-226955 A | 8/2003 |
| JP | 2005-044801 A | 2/2005 |
| JP | 2005-100947 A | 4/2005 |
| JP | 2005-150093 A | 6/2005 |
| JP | 2005-150102 A | 6/2005 |
| JP | 2006-294597 A | 10/2006 |
| JP | 2007-503102 A | 2/2007 |
| JP | 2009-182273 A | 8/2009 |
| JP | 2009-246236 A | 10/2009 |
| JP | 2009-544141 A | 12/2009 |
| JP | 2010-251075 A | 11/2010 |
| JP | 2011-108603 A | 6/2011 |
| JP | 2013-506945 A | 2/2013 |
| JP | 2014-146458 A | 8/2014 |
| JP | 2014-529176 A | 10/2014 |
| JP | 2014-531718 A | 11/2014 |
| JP | 2017-521848 A | 8/2017 |
| KR | 10-2014-0081468 A | 7/2014 |
| KR | 10-2016-0091172 A | 8/2016 |
| KR | 10-2017-0008540 A | 1/2017 |
| KR | 10-2017-0025874 A | 3/2017 |
| WO | 2009/055529 A1 | 4/2009 |

(56) References Cited

FOREIGN PATENT DOCUMENTS

| WO | 2010/036723 A1 | 4/2010 |
| --- | --- | --- |
| WO | 2011/039132 A1 | 4/2011 |
| WO | 2011/052607 A1 | 5/2011 |
| WO | 2012/065767 A1 | 5/2012 |
| WO | 2013/021955 A1 | 2/2013 |
| WO | 2013/035519 A1 | 3/2013 |
| WO | 2013/118659 A1 | 8/2013 |
| WO | 2013/146723 A1 | 10/2013 |
| WO | 2015/007586 A1 | 1/2015 |
| WO | 2015/053357 A1 | 4/2015 |
| WO | 2015/107194 A1 | 7/2015 |
| WO | 2016/001884 A1 | 1/2016 |
| WO | 2016/210419 A1 | 12/2016 |
| WO | 2017/047280 A1 | 3/2017 |
| WO | 2017/087403 A1 | 5/2017 |

OTHER PUBLICATIONS

Cucinella et al. (1982). "Calcium Alkoxyalanates I. Synthesis and Physicochemical Characterization," Journal of Organometallic Chemistry 224(1): 1-12.

Hudson et al. (2007). "Studies on Synthesis and Dehydrogenation Behavior of Magnesium Alanate and Magnesium-Sodium Alanate Mixture," International Journal of Hydrogen Energy 32(18): 4933-4938.

International Search Report and Written Opinion dated Feb. 15, 2019, directed to International Application No. PCT/GB2018/053663; 13 pages.

Lu et al. (Apr. 2002). "Synthesis, Structure, and Electrochemical Behavior of Li[NixLi(1/3-2x/3)Mn(2/3-x/3)]O2," Journal of the Electrochemical Society, 149(6): A778-A791.

Mehrotra et al. (Jan. 1978). "Preparation and Characterization of Some Volatile Double Isopropoxides of Aluminium with Alkaline Earth Metals," Inorganica Chemica Acta 29:131-136.

Metz et al. (2002). "Weakly Coordinating Al-, Nb-, Ta-, Y-, and La-Based Perfluoroaryloxymetalate Anions as Cocatalyst Components for Single-Site Olefin Polymerization," Organometallics 21(18): 3691-3702.

Park et al. (Apr. 2004). "Structural investigation and electrochemical behaviour of Li[NixLi(1/3-2x/3)Mn(2/3-x/3)]O2 compounds by a simple combustion method," Journal of Power Sources 129: 288-295.

Park et al. (May 2010). "Suppression of O2 evolution from oxide cathode for lithium-ion batteries: VOx-impregnated 0.5Li2MnO3-0.5LiNi0.4Co0.2Mn0.4O2 cathode," Chemical Communications, 46(23): 4190-4192.

Search Report dated Jun. 28, 2018, directed to GB Application No. 1721180.6; 2 pages.

Thackeray et al. (Aug. 2006). "Comments on the structural complexity of lithium-rich Li1+xM1-xO2 electrodes (M+Mn, Ni, Co) for lithium batteries," Electrochemistry Communications 8(9):1531-1538.

Turova et al. (1977). "Hydrolysis and Alcoholysis of Alkali Metal Aluminium Hydrides," Inorganica Chimica Acta, 21: 157-161.

Wu et al. (Mar. 2006). "High Capacity, Surface-Modified Layered Li[Li(1-x)/3Mn(2-x)/3Nix/3Cox/3]O2 Cathodes with Low Irreversible Capacity Loss," Electrochemical and Solid-State Letters 9(5): A221-A224.

Yasushi et al. (Nov. 16, 1984) "CAS No. [32843-22-4] Aluminate (1-), tetrakis(diphenylaminato)-, magnesium," (2 pages).

Govil et al., "Some Double Ethoxides of Alkaline Earth Metals with Aluminium", Synthesis and Reactivity in Inorganic and Metal-Organic Chemistry, vol. 5, No. 4, 1975, pp. 267-277.

International Search Report and Written Opinion received for PCT Patent Application No. PCT/GB2018/052537, dated Dec. 19, 2018, 17 pages.

International Search Report and Written Opinion received for PCT Patent Application No. PCT/GB2018/052538, dated Oct. 29, 2018, 11 pages.

International Search Report and Written Opinion received for PCT Patent Application No. PCT/GB2018/053655, dated Apr. 8, 2019, 15 pages.

International Search Report and Written Opinion received for PCT Patent Application No. PCT/GB2018/053656, dated Feb. 15, 2019, 11 pages.

International Search Report and Written Opinion received for PCT Patent Application No. PCT/GB2018/053657, dated Apr. 15, 2019, 14 pages.

International Search Report and Written Opinion received for PCT Patent Application No. PCT/GB2018/053659, dated Apr. 8, 2019, 16 pages.

International Search Report and Written Opinion received for PCT Patent Application No. PCT/GB2018/053660, dated Feb. 14, 2019, 9 pages.

Office Action received for Japanese Patent Application No. 2020-552157, dated Jun. 21, 2021, 10 pages (5 pages of English Translation and 5 pages of Original Document).

Office Action received for Japanese Patent Application No. 2020-552160, dated Jul. 5, 2021, 5 pages (2 pages of English Translation and 3 pages of Original Document).

Office Action received for Korean Patent Application No. 10-2020-7010108, dated Jul. 28, 2021, 10 pages (5 pages of English Translation and 5 pages of Original Document).

Office Action received for Korean Patent Application No. 10-2020-7010109, dated Jul. 28, 2021, 10 pages (5 pages of English Translation and 5 pages of Original Document).

Search Report dated Jun. 28, 2018, directed to GB Application 1721179.8; 2 pages.

Search Report dated Jun. 28, 2018, directed to GB Application No. 1721177.2; 2 pages.

Search Report dated Jun. 28, 2018, directed to GB Application No. 1721178.0; 2 pages.

Search Report dated May 30, 2018, directed to GB Application No. 1714770.3; 2 pages.

Search Report dated May 30, 2018, directed to GB Application No. 1714771.1; 2 pages.

Meese-Marktscheffel et al., "Magnesium-aluminum alkoxides: the synthesis of Mg[Al(OR)4]2 (R=Busec and Ph), structure of (thf)2Mg[(µ-OPh)2Al (OPh))2]2, and dynamic NMR of Mg[Al(OBusec)4]2", Polyhedron, 1994, vol. 13, No. 6-7, pp. 1045-1050.

Office Action received for Japanese Application No. 2020-515116, dated Oct. 12, 2021, 4 pages (2 pages of English Translation and 2 pages of Original Document).

Office Action received for Japanese Patent Application No. 2020552156 dated Sep. 7, 2021, 12 pages (6 pages of English Translation and 6 pages of Original Document).

Notification of Reason(S) for Refusal received for Korean Application No. 10-2020-7018773, dated Sep. 23, 2021, 12 pages (6 pages of English Translation and 6 pages of Original Document).

Office Action received for Japanese Patent Application No. 2020-552161, dated Sep. 7, 2021, 4 pages (2 pages of English Translation and 2 pages of Original Document).

Office Action received for Japanese Patent Application No. 2020-552159, dated Sep. 7, 2021, 4 pages (2 pages of English Translation and 2 pages of Original Document).

Office Action received for Korean Patent Application No. 10-2020-7018774, dated Sep. 23, 2021, 10 pages (5 pages of English Translation and 5 pages of Original Document).

Peretich, A.L., Amenta, D.S., Gilje, J.W. et al. "Crystal Structure of [Me2NCH(O)]2Mg[(|j-OPri)2Al(OPri)2]2". J Chem Crystallogr40, 716-719 (2010). https://doi.org/10.1007/s10870-010-9783-x.

Breger et al. "High-resolution X-ray diffraction, DIFFaX, NMR and first principles study of disorder in the Li2MnO3-Li[Ni1/2Mn1/2]O2 solid solution", Journal of Solid State Chemistry 178 (2005) 2575-2585.

Jiang et al. "Electrochemical and structural study of the layered, "Li-excess" lithium-ion battery electrode material Li[Li1/9Ni1/3Mn5/9]O2", Chem. Mater. 2009, 21, 2733-2745.

Kim et al.; "Synthesis and electrochemical behavior of Li[Li0.1Ni0.35-x/2CoxMn0.55-x/2]O2 cathode materials"; Solid State Ionics 164, pp. 43-49. (Year: 2003).

(56) References Cited

OTHER PUBLICATIONS

Kim et al.; ("Electrochemical properties of Li[Li(1-x)/3CoxMn(2-2x)/3]O2 (0<x<1) solid solutions prepared by poly-vinyl alcohol method"; Electrochemistry Communications 9, pp. 103-108. (Year: 2007).

Office Action received for Chinese Patent Application No. 201880081413.3, dated Mar. 15, 2022, 17 pages (10 pages of English Translation and 7 pages of Original Document).

Office Action received for Japanese Patent Application No. 2020-552157, dated Jan. 25, 2022, 5 pages (2 pages of English Translation and 3 pages of Original Document).

Park et al., "The Effects of Ni Doping on the Performance of O3-Lithium Manganese Oxide Material", Korean J Chem. Eng., vol. 21, No. 5, 2004, pp. 983-988.

Sun et al.;"The preparation and electrochemical performance of solid solutions LiCoO2-Li2MnO3 as cathode materials for lithium ion batteries"; Electrochimica Acta 51, pp. 5581-5586. (Year: 2006).

Thackeray et al. "Li2MnO3-stabilized LiMO2 (M=Mn, Ni, Co) electrodes for lithium-ion batteries'"; J. of Materials Chemistry, vol. 17, No. 30, pp. 3053-3272. (Year: 2007).

Xiang et al.; "Understanding the Influence of Composition and Synthesis Temperature on Oxygen Loss, Reversible Capacity, and Electrochemical Behavior of xLi2MnO3 (1 -x)LiCoO2 Cathodes in the First Cycle"; J. Phys. Chem. 118, pp. 23553-23558. (Year: 2014).

\* cited by examiner

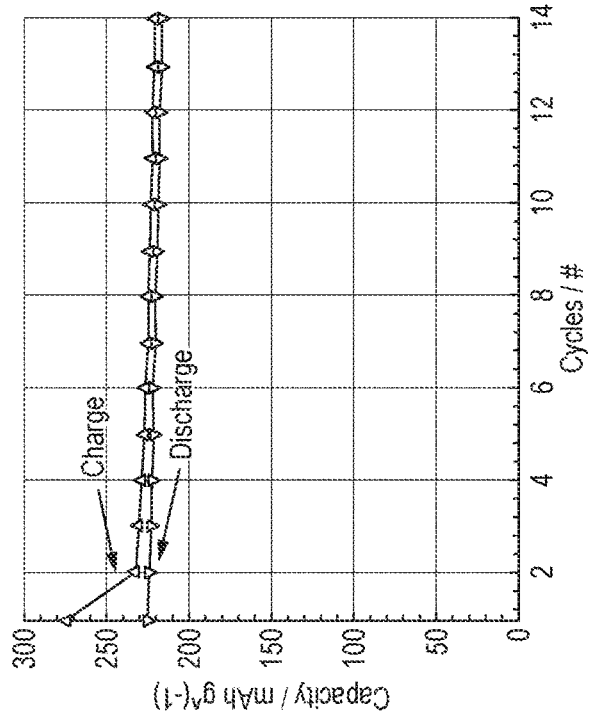
Fig. 2A
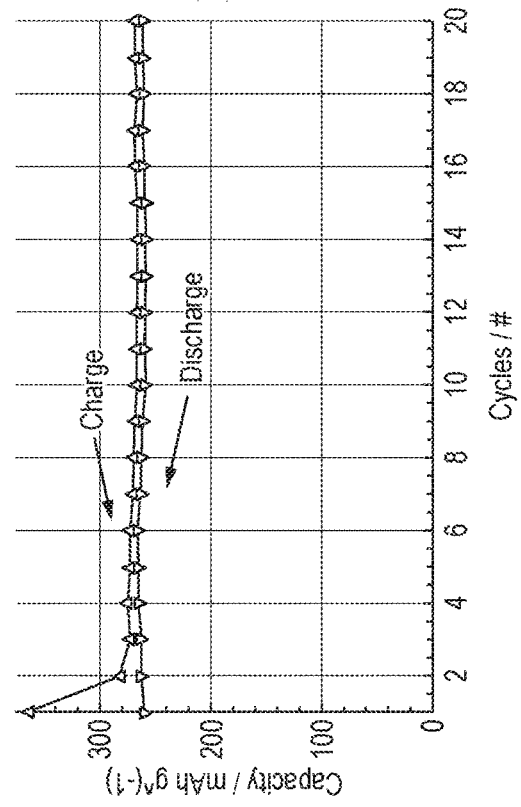
Fig. 2B
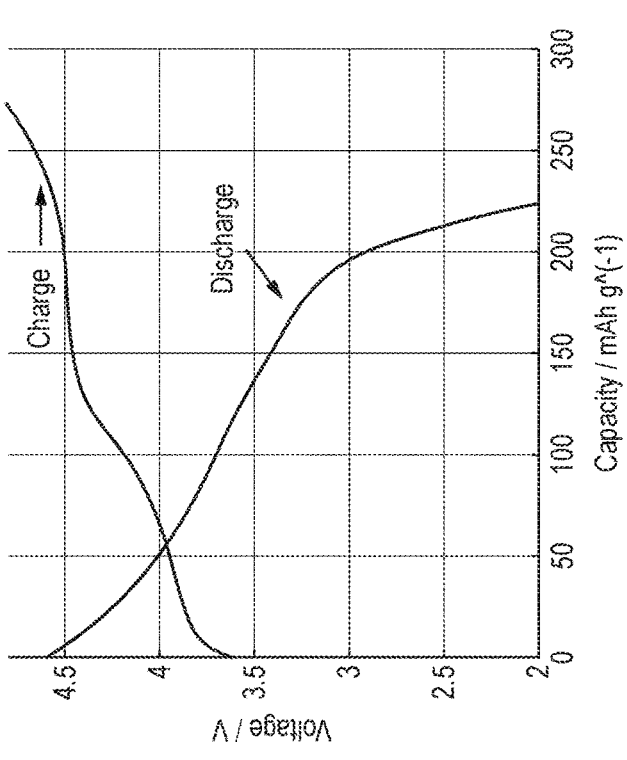
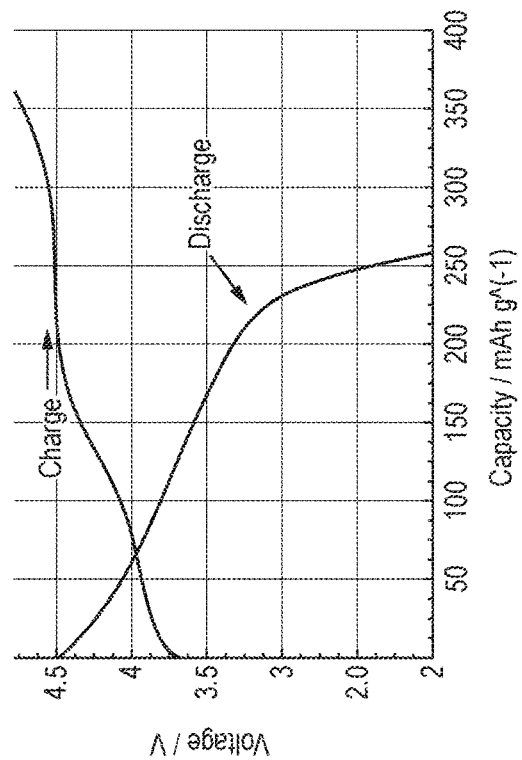

USE OF ALUMINUM IN A LITHIUM RICH CATHODE MATERIAL FOR SUPPRESSING GAS EVOLUTION FROM THE CATHODE MATERIAL DURING A CHARGE CYCLE AND FOR INCREASING THE CHARGE CAPACITY OF THE CATHODE MATERIAL

REFERENCE TO RELATED APPLICATIONS

This application is a national stage application under 35 U.S.C. 371 of International Application No. PCT/GB2018/053663, filed Dec. 18, 2018, which claims the priority of United Kingdom Application No. 1721180.6, filed Dec. 18, 2017, the entire contents of each of which are incorporated herein by reference.

FIELD OF THE DISCLOSURE

The present invention relates to a set of electroactive cathode compounds. More specifically the present invention relates to the use of a set of high capacity lithium rich compounds.

BACKGROUND OF THE DISCLOSURE

Conventional lithium ion batteries are limited in performance by the capacity of the material used to make the positive electrode (cathode).). Lithium rich blends of cathode materials containing blends of nickel manganese cobalt oxide offer a trade-off between safety and energy density. It is understood that charge is stored in the transition metal cations within such cathode materials. It has been suggested that the capacity, and therefore energy density, of cathode materials could be significantly increased if charge could be stored on anions (for example oxygen) reducing the need for such high amounts of heavy transition metal ions. However, a challenge remains to provide a material that can rely on the redox chemistries of both the anions and cations to store charge, and withstand charge/discharge cycles without compromising the safety of the material, or causing undesired redox reactions which would break down the material.

SUMMARY OF THE DISCLOSURE

In a first aspect, the present invention relates to the use of aluminium in a lithium rich cathode material of the general formula:

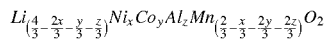

for suppressing gas evolution from the cathode material during a charge cycle.

In a examples of the use x is equal to or greater than 0 and equal to or less than 0.4; y is equal to or greater than 0.1 and equal to or less than 0.4; and z is equal to or greater than 0.02 and equal to or less than 0.3.

In a second aspect, the present invention relates to the use of aluminium in a lithium rich cathode material of the general formula

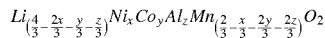

for increasing the charge capacity of the cathode material.

In examples of the use x is equal to or greater than 0 and equal to or less than 0.4; y is equal to or greater than 0.1 and equal to or less than 0.4; and z is equal to or greater than 0.02 and equal to or less than 0.3.

It has been found that a compound with an improved capacity can be achieved by reducing the amount of excess lithium and increasing the amount of nickel and/or cobalt and introducing an amount of aluminium. The particular compound as defined above exhibits a significantly large increase in capacity due to the degree of oxidation of the transition metals, the aluminium and also the oxidation of the oxide ions within the lattice. Without wishing to be bound by theory, it is understood that the presence of a particular amount of nickel and/or cobalt with an amount of aluminium substitution enables greater oxygen redox activity and thereby improves the electrochemical capacity of the material.

In addition, the compounds of the present invention exhibit improved stability during electrochemical cycling when compared to the transition metal substituted NMC lithium rich materials of the prior art. The evolution of molecular oxygen is ubiquitous with third row lithium-rich materials transition metal oxides where lithium has been exchanged for some of the transition metal ions ($Li_{1+x}M_{1-x}O_2$, where M is Ti, V, Cr, Mn, Fe, Co, Ni, Cu or Zn). These materials generally rely on oxygen redox to improve their charge capacity properties. Homogenous materials can suffer from molecular oxygen escaping from the crystal structure during cycling due to redox of the oxide anion. In turn, this reduces the capacity and useful lifetime of the material. However, the material of the present invention has improved capacity which is maintained over numerous cycles.

It is understood that when the charge imbalance caused by the removal of a lithium ion is balanced by the removal of an electron from the oxygen anion the resulting oxygen anion is unstable which results in undesired redox reactions and the evolution of molecular oxygen gas during charge cycling. Without wishing to be bound by theory, it is understood that the specific nickel, cobalt and aluminium content in the material relative to the lithium content avoids under-bonding within the lattice such that each oxygen anion is still bonded to ~3 cations. A potential solution to this problem might be to encapsulate the cathode layer or part of the cell in a gas impermeable membrane. However, this would add parasitic mass to the cell, thereby reducing the energy density of the resulting battery. However, the chemical approach of the present invention tunes the structure of the lattice using specific amounts of transition metals reduces the generation of oxygen gas from the material without the need to add layers to the cathode material or resulting battery cell.

The substitution of aluminium ions specifically for cobalt ions is advantageous for at least two reasons. Firstly, cobalt is provided in the lattice in either the $Co^{2+}$ or $Co^{3+}$ oxidation state. However, aluminium is provided in the lattice only as $Al^{3+}$ ions. Thus, aluminium is substituted for cobalt ions in the $Co^{3+}$ oxidation state, thereby ensuring that the charge balance of ions during a charge discharge cycle is maintained at this level of redox potential. Secondly, the atomic weight of aluminium is significantly less than cobalt. Therefore the general compound is lighter in weight without compromising capacity benefits, thus increasing the energy density of the material, and any subsequent cell using the material.

In examples x may be equal to or greater than 0 and equal to or less than 0.4, x may be equal to or greater than 0.2 and equal to or less than 0.4, x may be equal to or greater than 0.1 and equal to or less than 0.3, x may be equal to or greater than 0.1 and equal to or less than 0.2, x may be equal to or greater than 0.375 and equal to or less than 0.55. Specifically x may equal 0.2.

When x is 0.375, y may have a value equal to or greater than 0.275 and equal to or less than 0.325, and z may have a value equal to or greater than 0.025 and equal to or less than 0.075; when x is 0.4, y may have a value equal to or greater than 0.225 and equal to or less than 0.275, and z may have a value equal to or greater than 0.025 and equal to or less than 0.075; when x is 0.425, y may have a value equal to or greater than 0.175 and equal to or less than 0.225, and z may have a value equal to or greater than 0.025 and equal to or less than 0.075; and when x has value equal to or greater than 0.41 to less than or equal to 0.55, y may have a value equal to or greater than 0.025 and equal to or less than 0.275, and z may have a value equal to or greater than 0.025 and equal to or less than 0.075.

Notwithstanding the above, y may be equal to or greater than 0.1 and equal to or less than 0.4. More particularly, y may be equal to or greater than 0.1 and equal to or less than 0.3. More particularly, y may be equal to or greater than 0.1 and equal to or less than 0.2. More particularly, y may be equal to or greater than 0.1 and equal to or less than 0.15. Specifically y may equal 0.1 or 0.15. When y is 0.025, x has a value equal to or greater than 0.4 and equal to or less than 0.55, and z has a value equal to or greater than 0.025 and equal to or less than 0.075; when y is 0.05, x has a value equal to or greater than 0.5 and equal to or less than 0.525, and z has a value equal to or greater than 0.025 and equal to or less than 0.05; preferably z has a value equal to 0.05; when y is 0.075, x has a value equal to or greater than 0.475 and equal to or less than 0.525, and z has a value equal to or greater than 0.025 and equal to or less than 0.075; when y is 0.1, x has a value equal to or greater than 0.475 and equal to or less than 0.5, and z has a value equal to or greater than 0.025 and equal to or less than 0.05; preferably z has a value equal to 0.05; when y is 0.125, x has a value equal to or greater than 0.45 and equal to or less than 0.5, and z has a value equal to or greater than 0.025 and equal to or less than 0.075; when y is 0.15, x has a value equal to or greater than 0.45 and equal to or less than 0.475, and z has a value equal to 0.05; when y is 0.175, x has a value equal to or greater than 0.425 and equal to or less than 0.475, and z has a value equal to 0.025 or 0.075; when y is 0.2, x has a value equal to or greater than 0.425 and equal to or less than 0.442, and z has a value equal to 0.05; preferably x has a value equal to or greater than 0.425 and equal to or less than 0.433; when y is 0.225, x has a value equal to or greater than 0.4 and equal to or less than 0.45, and z has a value equal to 0.025 or 0.075; when y is 0.25, x has a value equal to or greater than 0.4 and equal to or less than 0.41, and z has a value equal to 0.05; when y is 0.275, x has a value equal to or greater than 0.375 and equal to or less than 0.41, and z has a value equal to 0.025 or 0.075; when y is 0.3, x has a value equal to 0.375, and z has a value equal to 0.05; when y is 0.325, x has a value equal to 0.375, and z has a value equal to 0.025.

Notwithstanding the above, in a particular embodiment, z may be greater than 0.02 and equal to or less than 0.3, z may be equal to or greater than 0.05 and equal to or less than 0.3, z may be equal to or greater than 0.1 and equal to or less than 0.3, z may be equal to or greater than 0.15 and equal to or less than 0.3, z may be equal to or greater than 0.05 and equal to or less than 0.15, z may be equal to or greater than 0.025 and equal to or less than 0.075. Specifically z may equal 0.05. When z has value equal to or greater than 0.05, y may have a value equal to or greater than 0.05 and equal to or less than 0.325, and x may have a value equal to or greater than 0.425 and equal to or less than 0.55.

In examples x+y+z may be greater than 0 and equal to or less than 0.4. In a more specific embodiment x+y+z may be equal to or greater than 0.35 and equal to or less than 0.4. In an even more particular embodiment z is equal to 0.05, and x+y is equal to or greater than 0.3 and equal to or less than 0.35. Specifically x+y may equal 0.3 or 0.35.

In examples x is equal to 0.2; y is equal 0.15; and z is equal 0.05. This particular compound is thus $Li_{1.1333}Ni_{0.2}Co_{0.15}Al_{0.05}Mn_{0.4667}O_2$. In an alternative particular embodiment x is equal to 0.2; y is equal 0.1; and z is equal 0.05. This alternative particular compound is thus $Li_{1.5}Ni_{0.2}Co_{0.1}Al_{0.05}Mn_{0.5}O_2$. These particular compounds have demonstrated an improved capacity for charge and good stability over a number of cycles.

The compound may be defined as having a layered structure. Typically layered structures have been shown to have the highest energy density. When in the layered form, the material can be further defined using the general formula $(1-a-b-c)L_2MnO_3.aLiCoO_2.bLiNi_{0.5}Mn_{0.5}O_2.cLiAlO_2$ such that a=y; b=2x and c=z. Thus, a may equal to or less than 0.15; b is 0.4; and c is equal to or greater than 0.05. More specifically, a is equal or greater than 0.1 and equal to or less than 0.15; and c is equal to or greater than 0.05 and equal to or less than 0.1. Specifically the material may be $0.4L_2MnO_3.0.15LiCoO_2.0.4LiNi_{0.5}Mn_{0.5}O_2.0.05LiAlO_2$, or the material may be $0.45L_2MnO_3.0.1LiCoO_2.0.4LiNi_{0.5}Mn_{0.5}O_2.0.05LiAl_2$. These particular layered structures exhibit improved capacity and a higher degree of stability during a charge/discharge cycle.

BRIEF DESCRIPTION OF THE FIGURES

In order that the present invention may be more readily understood, an embodiment of the invention will now be described, by way of example, with reference to the accompanying Figures, in which:

FIGS. 2B-2B show first cycle galvanostatic load curves for the synthesised materials;

DETAILED DESCRIPTION OF THE DISCLOSURE

The present invention will now be illustrated with reference to the following examples.

Example 1

Synthesis of the Nickel-Cobalt-Aluminium Substituted Lithium Rich Materials

The Formaldehyde-Resorcinol sol gel synthetic route was employed to synthesise materials with general formula

Figure 1A:
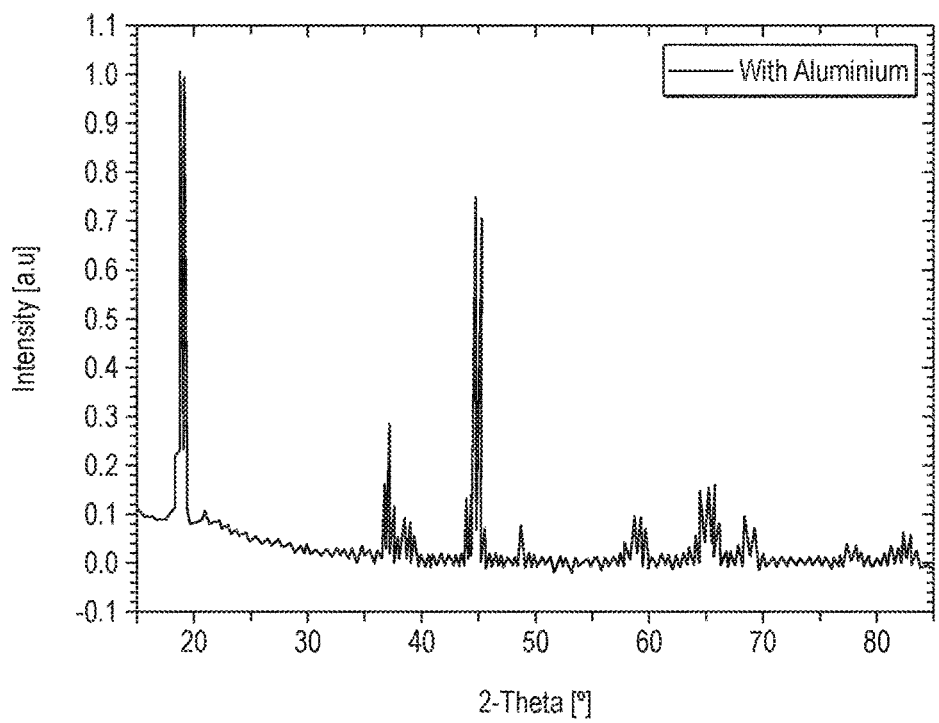
FIGS. 1A-1B show powder X-ray Diffraction patterns of the synthesised materials in Example 1.
Figure 1B:
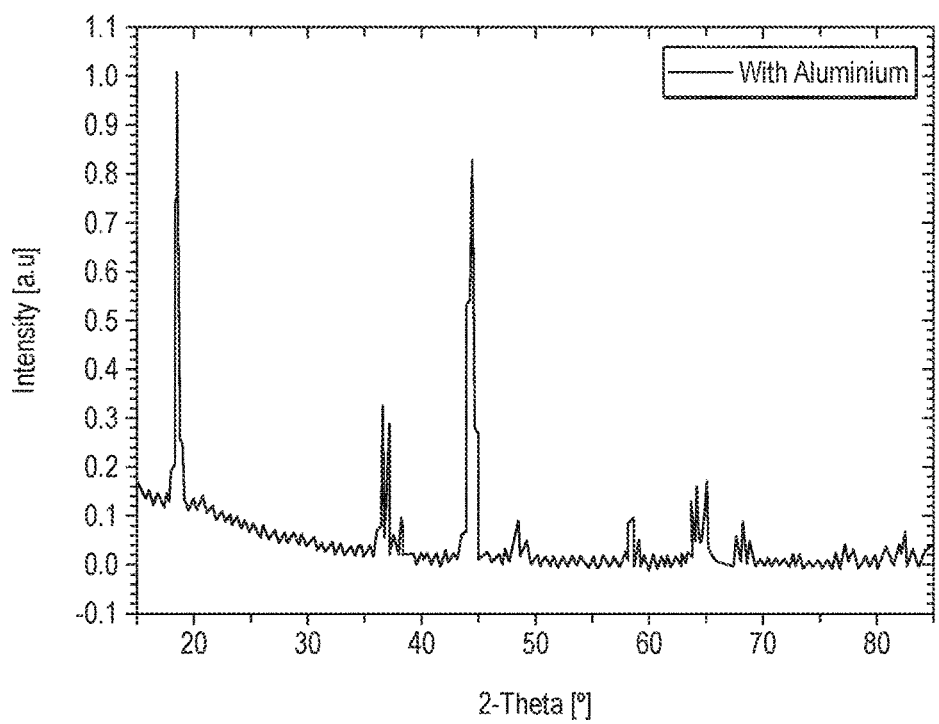
Figure 3A:
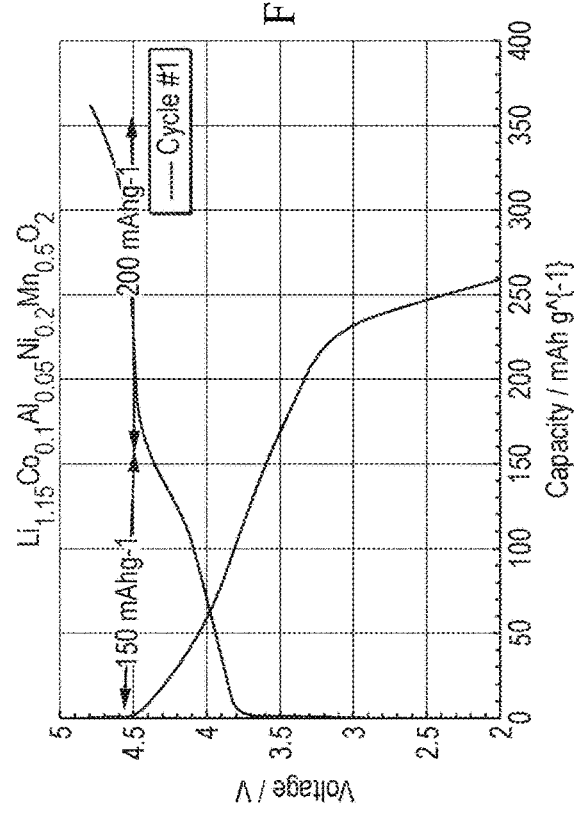
FIGS. 3A-3B shows improved charge capacity for synthesised materials versus non-aluminium doped equivalents.
Figure 3B:
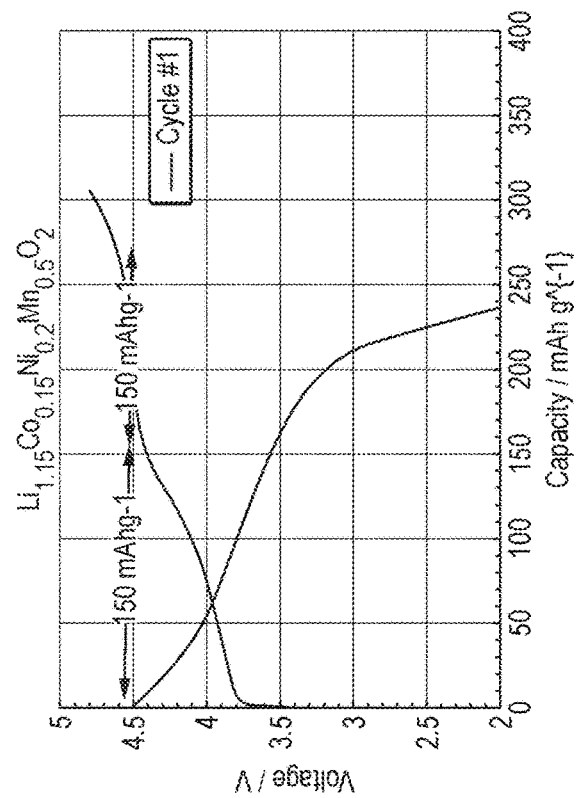

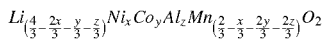

with a composition having x=0.2 y=0.15 z=0.05 (composition in FIGS. 1A, 2A, and 3A); and with a composition having x=0.2 y=0.1 z=0.05 (composition in FIGS. 1B, 2B, and 3B).

All the reagents ratios were calculated in order to obtain 0.01 mol of the final product.

Stoichiometric amounts of $CH_3COOLi.2H_2O$ (98.0%, Sigma Aldrich®, $(CH_3COO)_2Mn.4H_2O$ (>99.0%, Sigma Aldrich®, $(CH_3COO)_2Co.4H_2O$ (99.0% Sigma Aldrich®, $Al_2(SO_4)_3.4H_2O$ (Sigma Aldrich® and $(CH_3COO)_2Ni.4H_2O$ (99.0% Sigma Aldrich® were dissolved in 50 mL of water with 0.25 mmol of $CH_3COOLi.2H_2O$ (99.0%, Sigma Aldrich® corresponding to 5% moles of lithium with respect to the 0.01 moles of synthesized material. At the same time 0.1 mol of resorcinol (99.0%, Sigma Aldrich® was dissolved in 0.15 mol of formaldehyde (36.5% w/w solution in water, Fluka®. Once all the reagents were completely dissolved in their respective solvents, the two solutions were mixed and the mixture was vigorously stirred for 1 hour. The resulting solution, containing 5% molar excess of lithium, was subsequently heated in an oil bath at 80° C. until the formation of a homogeneous white gel.

The gel was finally dried at 90° C. overnight and then heat treated at 500° C. for 15 hours and 800° C. for 20 hours.

Example 2

Structural Analysis and Characterisation of the Nickel-Cobalt-Aluminium Substituted Lithium Rich Materials The materials according to Example 1 were examined with Powder X-Ray Diffraction (PXRD) which was carried out utilising a Rigaku® SmartLab equipped with a 9 kW Cu rotating anode.

FIGS. 1A and 1B shows Powder X-ray Diffraction patterns of the synthesised materials. These are characteristic of a layered materials with some cation ordering in the transition layer. All of the patterns appear to show the major peaks consistent with a close-packed layered structure such as $LiTMO_2$ with a R-3m space group. Additional peaks are observed in the range 20-30 2Theta degrees which cannot be assigned to the R-3m space. The order derives from the atomic radii and charge density differences between $Li^+$ (0.59 Å), $Ni^{+2}$ (0.69 Å) and $Mn^{4+}$ (0.83 Å) and appears the strongest in the structures of the low nickel doped oxides. The peaks are not as strong as in materials where a perfect order exists as in $Li_2MnO_3$. No presence of extra-peaks due to impurities was observed.

Example 3

Electrochemical Analysis of the Nickel-Cobalt-Aluminium Substituted Lithium Rich Materials The materials according to Example 1 were characterised electrochemically through galvanostatic cycling performed with a BioLogic VMP3 and a Maccor 4600 series potentiostats. All the samples were assembled into stainless steel coincells against metallic lithium and cycled between 2 and 4.8 V vs. $Li^+$/Li for 100 cycles at a current rate of 50 mAg$^{-1}$.

The electrolyte employed was LP30 (a 1M solution of $LiPF_6$ in 1:1 w/w ratio of EC:DMC).

FIGS. 2A-2B and FIGS. 3A-3B show the potential curves during the charge and subsequent discharge of the first cycle for each material according to Example 1 (FIG. 3A-3B includes plots of non-doped aluminium cathode materials as a comparative example). Both samples present a high voltage plateau of different lengths centered on 4.5 V vs. $Li^+$/Li$^0$, and a sloped region at the beginning of the charge. The length of this region may be attributed to the oxidation of nickel from $Ni^{+2}$ toward $Ni^{+4}$ and $Co^{+3}$ toward $Co^{+4}$ and appears to be in good agreement with the amount of lithium (i.e. charge) that would be extracted accounting for solely the transition metal redox activity.

During the first discharge, neither material shows the presence of a reversible plateau, indicating a difference in the thermodynamic pathways followed during the extraction (charge) and insertion (discharge) of lithium ions from/in the lattice of each sample.

For both materials according to Example 1 the first cycle presents the lowest coulombic efficiency value due to the presence of the high potential plateau which is not reversible. The coulombic efficiencies appear to quickly improve from the first cycle values, around 60-80%, to values higher than 98% within the first five cycles.

Compositions demonstrating the technical benefits in accordance with the Examples and the present invention are detailed below.

| Composition | Li | Mn | Co | Ni | Al | O |
| --- | --- | --- | --- | --- | --- | --- |
| 1 | 1.15 | 0.25 | 0.025 | 0.55 | 0.025 | 2 |
| 2 | 1.15 | 0.225 | 0.075 | 0.525 | 0.025 | 2 |
| 3 | 1.15 | 0.2 | 0.125 | 0.5 | 0.025 | 2 |
| 4 | 1.15 | 0.175 | 0.175 | 0.475 | 0.025 | 2 |
| 5 | 1.133333 | 0.275 | 0.025 | 0.541667 | 0.025 | 2 |
| 6 | 1.133333 | 0.25 | 0.075 | 0.516667 | 0.025 | 2 |
| 7 | 1.133333 | 0.225 | 0.125 | 0.491667 | 0.025 | 2 |
| 8 | 1.133333 | 0.2 | 0.175 | 0.466667 | 0.025 | 2 |
| 9 | 1.133333 | 0.175 | 0.225 | 0.441667 | 0.025 | 2 |
| 10 | 1.116667 | 0.3 | 0.025 | 0.533333 | 0.025 | 2 |
| 11 | 1.116667 | 0.275 | 0.075 | 0.508333 | 0.025 | 2 |
| 12 | 1.116667 | 0.25 | 0.125 | 0.483333 | 0.025 | 2 |
| 13 | 1.116667 | 0.225 | 0.175 | 0.458333 | 0.025 | 2 |
| 14 | 1.116667 | 0.2 | 0.225 | 0.433333 | 0.025 | 2 |
| 15 | 1.116667 | 0.175 | 0.275 | 0.408333 | 0.025 | 2 |
| 16 | 1.1 | 0.325 | 0.025 | 0.525 | 0.025 | 2 |
| 17 | 1.1 | 0.3 | 0.075 | 0.5 | 0.025 | 2 |
| 18 | 1.1 | 0.275 | 0.125 | 0.475 | 0.025 | 2 |
| 19 | 1.1 | 0.25 | 0.175 | 0.45 | 0.025 | 2 |
| 20 | 1.1 | 0.225 | 0.225 | 0.425 | 0.025 | 2 |
| 21 | 1.1 | 0.2 | 0.275 | 0.4 | 0.025 | 2 |
| 22 | 1.1 | 0.175 | 0.325 | 0.375 | 0.025 | 2 |
| 23 | 1.15 | 0.25 | 0 | 0.55 | 0.05 | 2 |
| 24 | 1.15 | 0.225 | 0.05 | 0.525 | 0.05 | 2 |
| 25 | 1.15 | 0.2 | 0.1 | 0.5 | 0.05 | 2 |
| 26 | 1.15 | 0.175 | 0.15 | 0.475 | 0.05 | 2 |
| 27 | 1.133333 | 0.275 | 0 | 0.541667 | 0.05 | 2 |
| 28 | 1.133333 | 0.25 | 0.05 | 0.516667 | 0.05 | 2 |
| 29 | 1.133333 | 0.225 | 0.1 | 0.491667 | 0.05 | 2 |
| 30 | 1.133333 | 0.2 | 0.15 | 0.466667 | 0.05 | 2 |
| 31 | 1.133333 | 0.175 | 0.2 | 0.441667 | 0.05 | 2 |
| 32 | 1.116667 | 0.3 | 0 | 0.533333 | 0.05 | 2 |
| 33 | 1.116667 | 0.275 | 0.05 | 0.508333 | 0.05 | 2 |
| 34 | 1.116667 | 0.25 | 0.1 | 0.483333 | 0.05 | 2 |
| 35 | 1.116667 | 0.225 | 0.15 | 0.458333 | 0.05 | 2 |
| 36 | 1.116667 | 0.2 | 0.2 | 0.433333 | 0.05 | 2 |
| 37 | 1.116667 | 0.175 | 0.25 | 0.408333 | 0.05 | 2 |
| 38 | 1.1 | 0.325 | 0 | 0.525 | 0.05 | 2 |
| 39 | 1.1 | 0.3 | 0.05 | 0.5 | 0.05 | 2 |
| 40 | 1.1 | 0.275 | 0.1 | 0.475 | 0.05 | 2 |
| 41 | 1.1 | 0.25 | 0.15 | 0.45 | 0.05 | 2 |
| 42 | 1.1 | 0.225 | 0.2 | 0.425 | 0.05 | 2 |
| 43 | 1.1 | 0.2 | 0.25 | 0.4 | 0.05 | 2 |

-continued

| Composition | Li | Mn | Co | Ni | Al | O |
|---|---|---|---|---|---|---|
| 44 | 1.1 | 0.175 | 0.3 | 0.375 | 0.05 | 2 |
| 45 | 1.15 | 0.225 | 0.025 | 0.525 | 0.075 | 2 |
| 46 | 1.15 | 0.2 | 0.075 | 0.5 | 0.075 | 2 |
| 47 | 1.15 | 0.175 | 0.125 | 0.475 | 0.075 | 2 |
| 48 | 1.133333 | 0.25 | 0.025 | 0.516667 | 0.075 | 2 |
| 49 | 1.133333 | 0.225 | 0.075 | 0.491667 | 0.075 | 2 |
| 50 | 1.133333 | 0.2 | 0.125 | 0.466667 | 0.075 | 2 |
| 51 | 1.133333 | 0.175 | 0.175 | 0.441667 | 0.075 | 2 |
| 52 | 1.116667 | 0.275 | 0.025 | 0.508333 | 0.075 | 2 |
| 53 | 1.116667 | 0.25 | 0.075 | 0.483333 | 0.075 | 2 |
| 54 | 1.116667 | 0.225 | 0.125 | 0.458333 | 0.075 | 2 |
| 55 | 1.116667 | 0.2 | 0.175 | 0.433333 | 0.075 | 2 |
| 56 | 1.116667 | 0.175 | 0.225 | 0.408333 | 0.075 | 2 |
| 57 | 1.1 | 0.3 | 0.025 | 0.5 | 0.075 | 2 |
| 58 | 1.1 | 0.275 | 0.075 | 0.475 | 0.075 | 2 |
| 59 | 1.1 | 0.25 | 0.125 | 0.45 | 0.075 | 2 |
| 60 | 1.1 | 0.225 | 0.175 | 0.425 | 0.075 | 2 |
| 61 | 1.1 | 0.2 | 0.225 | 0.4 | 0.075 | 2 |
| 62 | 1.1 | 0.175 | 0.275 | 0.375 | 0.075 | 2 |

Compositions demonstrating higher levels of the technical benefits in accordance with the Examples and the present invention are detailed below.

| Composition | Li | Mn | Co | Ni | Al | O |
|---|---|---|---|---|---|---|
| 1 | 1.15 | 0.25 | 0 | 0.55 | 0.05 | 2 |
| 2 | 1.15 | 0.225 | 0.05 | 0.525 | 0.05 | 2 |
| 3 | 1.15 | 0.2 | 0.1 | 0.5 | 0.05 | 2 |
| 4 | 1.15 | 0.175 | 0.15 | 0.475 | 0.05 | 2 |
| 5 | 1.133333 | 0.275 | 0 | 0.541667 | 0.05 | 2 |
| 6 | 1.133333 | 0.25 | 0.05 | 0.516667 | 0.05 | 2 |
| 7 | 1.133333 | 0.225 | 0.1 | 0.491667 | 0.05 | 2 |
| 8 | 1.133333 | 0.2 | 0.15 | 0.466667 | 0.05 | 2 |
| 9 | 1.116667 | 0.3 | 0 | 0.533333 | 0.05 | 2 |
| 10 | 1.116667 | 0.275 | 0.05 | 0.508333 | 0.05 | 2 |
| 11 | 1.116667 | 0.25 | 0.1 | 0.483333 | 0.05 | 2 |
| 12 | 1.116667 | 0.225 | 0.15 | 0.458333 | 0.05 | 2 |
| 13 | 1.116667 | 0.2 | 0.2 | 0.433333 | 0.05 | 2 |
| 14 | 1.1 | 0.325 | 0 | 0.525 | 0.05 | 2 |
| 15 | 1.1 | 0.3 | 0.05 | 0.5 | 0.05 | 2 |
| 16 | 1.1 | 0.275 | 0.1 | 0.475 | 0.05 | 2 |
| 17 | 1.1 | 0.25 | 0.15 | 0.45 | 0.05 | 2 |
| 18 | 1.1 | 0.225 | 0.2 | 0.425 | 0.05 | 2 |

Figure 5:
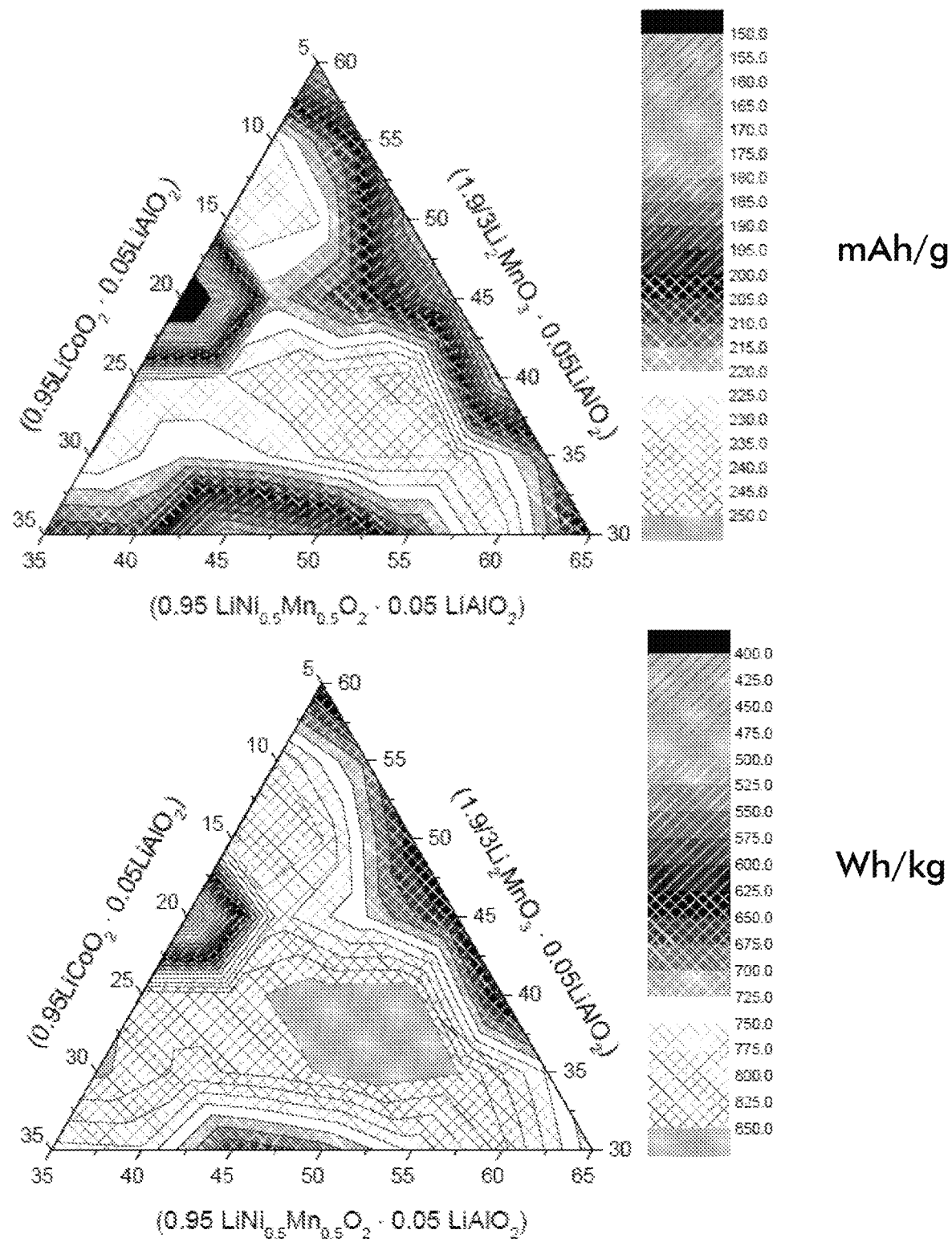
FIG. 5 shows ternary contour plots capacity and energy maps during discharge for materials of the present invention at 30° C., cycle 1, 2-4.8 V vs. Li/Li$^+$.

These materials were tested in accordance with the method above, and the results are shown in FIG. 5 as a ternary contour plot capacity and energy map during discharge for materials of the present invention at 30° C. and 55° C. C/10, 2-4.8 V vs. Li/Li$^+$.

Example 4

Gas Evolution During the First Cycle of the Nickel-Cobalt-Aluminium Substituted Lithium Rich Materials One pellet of Composition 1 $Li_{1.1333}Co_{0.15}Al_{0.05}Ni_{0.2}Mn_{0.4667}O_2$ was assembled into a Swagelok® test cell specifically machined to carry out an Operando Electrochemical Mass Spectrometry (OEMS) measurement. The mass spectrometry measurement involved in the OEMS experiment was performed with a Thermo-Fisher quadrupolar mass spectrometer. OEMS was performed on the set of materials in order to get an insight on the origin of the extra-capacity that is observed during the first cycle.

Figure 4:
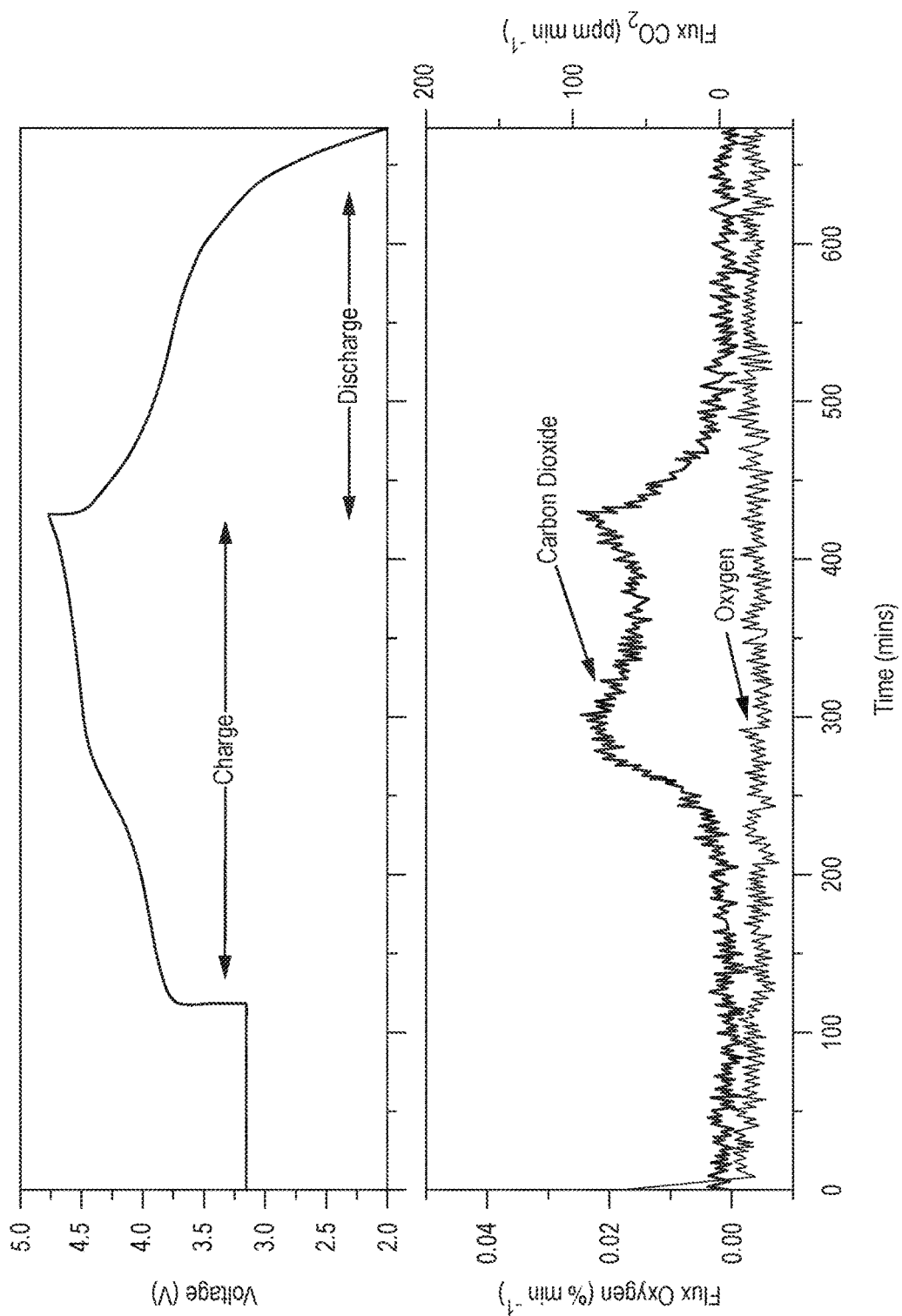
FIG. 4 shows OEMS analysis of one of the materials according to the present invention.

FIG. 4 shows OEMS analysis of the nickel doped $Li_{1.1333}Co_{0.15}Al_{0.05}Ni_{0.2}Mn_{0.4667}O_2$ respectively. The graph shows the galvanostatic curve during the first two cycles (top lines in each graph), the oxygen trace, and the carbon dioxide trace for each material. Argon was used as carrier gas with a flux rate of 0.7 mL/min and the electrode was cycled against metallic lithium at a rate of 15 mAg$^{-1}$ between 2 and 4.8 V vs. Li$^+$/Li$^0$) for all the materials. The electrolyte employed was a 1M solution of LiPF$_6$ in propylene carbonate.

$CO_2$ was the only gaseous species detected for all the samples and from FIG. 4, a progressively lower amount of gas released as the amount of dopant nickel increases. $CO_2$ peaks at the beginning of the high potential plateau (around 4.5 V vs. Li$^+$/Li$^0$ region and progressively decreasing until the end of charge.

Figure 6:
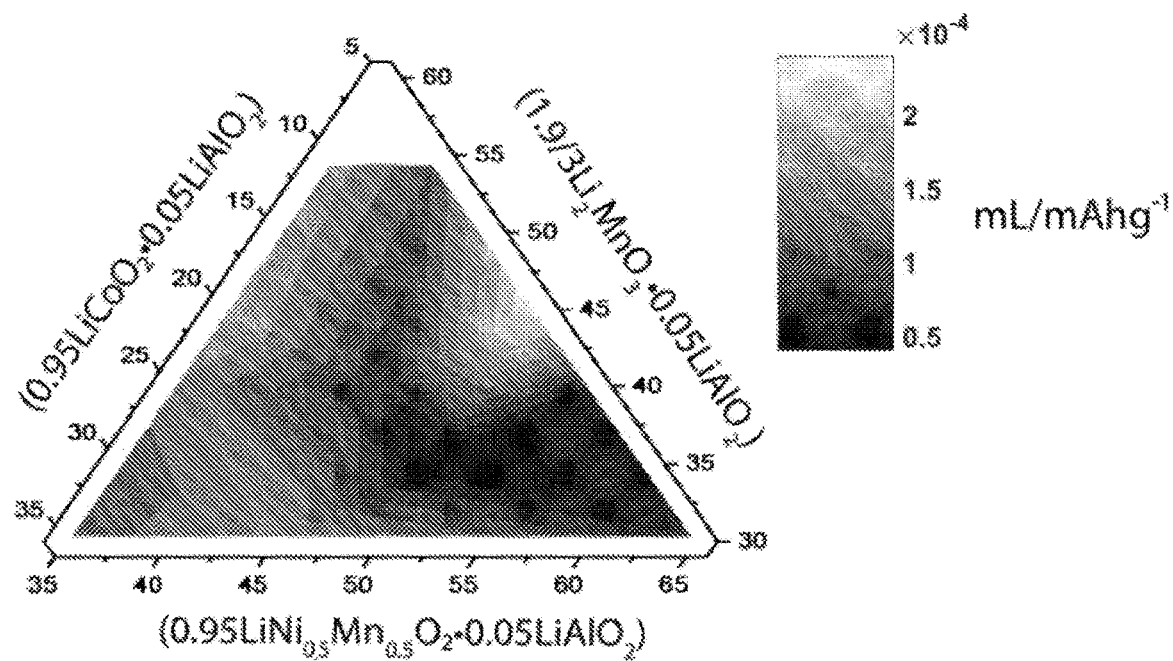
FIG. 6 shows ternary contour plots gas loss maps during discharge for materials of the present invention at 30° C., C/10, 2-4.8 V vs. Li/Li$^+$.
Figure 6:
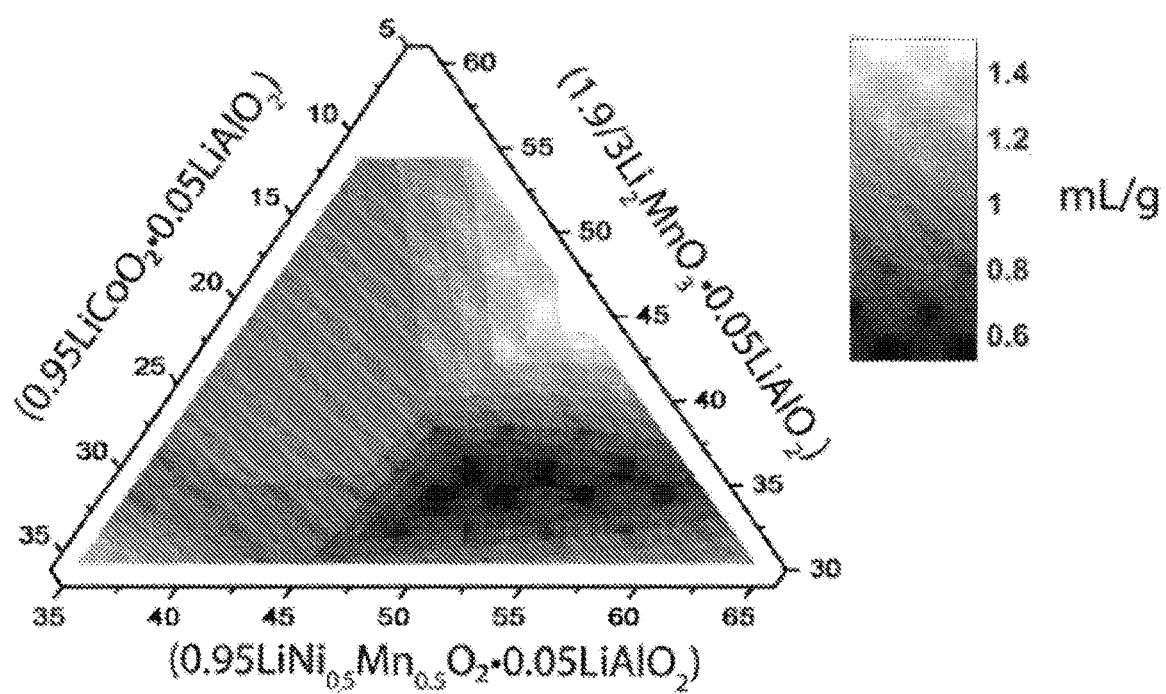

One pellet of each material according to the present invention (as tabulated above in Example 3) was assembled into a EL-Cell PAT-Cell-Press® single cell. All the samples were assembled versus metallic lithium and cycled from OCV to 4.8 V vs. Li+/Li and then discharged to 2V at a current rate of 50 mAg-1. The electrolyte employed was LP30 (a 1M solution of LiPF6 in 1:1 w/w ratio of EC:DMC). This cell was specifically designed to record the pressure changes within the headspace, this could then be related to the mols of gas evolved from the cathode. The pressure sensor in the cell was connected via a controller box which was linked to a computer via a USB link. This was then logged via the Datalogger and EC-Link Software provided by EL-Cell®. The data was logged as Voltage, Current, time and pressure. These values could be combined through the ideal gas law to calculate the number of mols of gas evolved on cycling which could be used to calculate the volume of gas evolved under ambient conditions. The total gas loss for each material during charge was calculated and a contour plot generated as FIG. 6 which shows gas loss as a function of composition within the ternary space.

The invention claimed is:

1. A method comprising:
    suppressing gas evolution from a cathode material during a charge cycle by incorporating an aluminium doped lithium rich cathode material of the general formula:

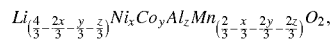

wherein x is equal to or greater than 0.375 and equal to or less than 0.55.

2. The method of claim 1, wherein the gas is molecular oxygen and/or carbon dioxide.

3. The method of claim 1, y is equal to or greater than 0.025 and equal to or less than 0.325; and z is equal to or greater than 0.025 and equal to or less than 0.075.

4. The method of claim 1, wherein x+y+z is equal to or less than 0.7.

5. The method of claim 1, wherein x+y+z is equal to or greater than 0.375 and equal to or less than 0.7.

6. The method of claim 1, wherein y is 0.3, x has a value equal to 0.375, and z has a value equal to 0.05.

7. The method of claim 1, wherein when y is 0.325, x has a value equal to 0.375, and z has a value equal to 0.025.

8. The method of claim 1, wherein the cathode material has a layered structure.

9. The method of claim 8, wherein the layered structure is expressed as the general formula:

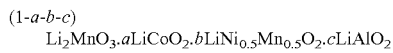

wherein a is equal to y;
b is equal to 2x; and
c is equal to z.

10. The method of claim 9, wherein the cathode material is
0.4Li$_2$MnO$_3$.0.15LiCoO$_2$.0.4LiNi$_{0.5}$Mn$_{0.5}$O$_2$.0.05LiAlO$_2$.

11. The method of claim 9, wherein the cathode material is
0.45Li$_2$MnO$_3$.0.1LiCoO$_2$.0.4LiNi$_{0.5}$Mn$_{0.5}$O$_2$.0.05LiAlO$_2$.

12. The method of claim 1, wherein the cathode material is
0.4Li$_2$MnO$_3$.0.15LiCoO$_2$.0.4LiNi$_{0.5}$Mn$_{0.5}$O$_2$.0.05LiAlO$_2$.

13. The method of claim 1, wherein the cathode material is
0.45Li$_2$MnO$_3$.0.1LiCoO$_2$.0.4LiNi$_{0.5}$Mn$_{0.5}$O$_2$.0.05LiAlO$_2$.

14. A method comprising:
increasing charge capacity of a cathode material by incorporating an aluminium doped lithium rich cathode material of the general formula:

$$Li_{(\frac{4}{3}-\frac{2x}{3}-\frac{y}{3}-\frac{z}{3})}Ni_xCo_yAl_zMn_{(\frac{2}{3}-\frac{x}{3}-\frac{2y}{3}-\frac{2z}{3})}O_2,$$

wherein x is equal to or greater than 0.375 and equal to or less than 0.55.

15. The method of claim 14, y is equal to or greater than 0.025 and equal to or less than 0.325; and z is equal to or greater than 0.025 and equal to or less than 0.075.

16. The method of claim 15, wherein x is equal to or greater than 0.375 and equal to or less than 0.55.

17. The method of claim 14, wherein x+y+z is equal to or less than 0.7.

18. The method of claim 14, wherein x+y+z is equal to or greater than 0.375 and equal to or less than 0.7.

19. The method of claim 14, wherein the cathode material has a layered structure.

20. The method of claim 19, wherein the layered structure is expressed as the general formula:

$$(1-a-b-c)Li_2MnO_3.aLiCoO_2.bLiNi_{0.5}Mn_{0.5}O_2.cLiAlO_2$$

wherein a is equal to y;
b is equal to 2x; and
c is equal to z.

* * * * *